US008885318B2

(12) United States Patent
Stockman

(10) Patent No.: US 8,885,318 B2
(45) Date of Patent: Nov. 11, 2014

(54) HARD START KIT FOR MULTIPLE REPLACEMENT APPLICATIONS

(71) Applicant: American Radionic Company, Inc., Palm Coast, FL (US)

(72) Inventor: Richard Stockman, Ormond Beach, FL (US)

(73) Assignee: American Radionic Company, Inc., Palm Coast, FL (US)

( * ) Notice: Subject to any disclaimer, the term of this patent is extended or adjusted under 35 U.S.C. 154(b) by 0 days.

(21) Appl. No.: 13/826,689

(22) Filed: Mar. 14, 2013

(65) Prior Publication Data

US 2013/0214720 A1    Aug. 22, 2013

Related U.S. Application Data

(63) Continuation of application No. 12/927,476, filed on Nov. 15, 2010, now Pat. No. 8,456,795.

(60) Provisional application No. 61/281,141, filed on Nov. 13, 2009.

(51) Int. Cl.
*H01G 4/32* (2006.01)
*H01G 4/38* (2006.01)
*H01G 4/232* (2006.01)
*H01G 4/236* (2006.01)

(52) U.S. Cl.
CPC . *H01G 4/32* (2013.01); *H01G 4/38* (2013.01); *H01G 4/232* (2013.01); *H01G 4/236* (2013.01)
USPC ................. 361/301.5; 361/301.2; 361/502; 361/504; 361/517; 361/519

(58) Field of Classification Search
CPC ........... H01G 4/32; H01G 4/38; H01G 4/232; H01G 4/236
USPC ................ 361/301.5, 301.1, 301.2, 502–504, 361/509–512, 516–519, 528–530
See application file for complete search history.

(56) References Cited

U.S. PATENT DOCUMENTS

| 3,304,473 A | 2/1967 | Netherwood et al. |
| 3,377,510 A | 4/1968 | Rayno |
| 3,921,041 A | 11/1975 | Stockman |
| 3,988,650 A | 10/1976 | Fritze |
| 4,028,595 A | 6/1977 | Stockman |
| 4,106,068 A | 8/1978 | Flanagan |

(Continued)

OTHER PUBLICATIONS

American Radionic Introduces Capacitors Without Compromise, Copyright 1989.

(Continued)

*Primary Examiner* — Nguyen T Ha
(74) *Attorney, Agent, or Firm* — Fish & Richardson P.C.

(57) ABSTRACT

A hard start capacitor replacement unit has a plurality of capacitors in a container sized to fit in existing hard start capacitor space. The capacitors are 4 metallized film capacitors wound in a single cylindrical capacitive element. The container has a common terminal and capacitors value terminals for the plurality of capacitors, which may be connected singly or in combination to provide a selected capacitance. An electronic or other relay connects the selected capacitance in parallel with a motor run capacitor. The hard start capacitor replacement unit is thereby adapted to replace a wide variety of hard start capacitors.

24 Claims, 4 Drawing Sheets

(56) References Cited

U.S. PATENT DOCUMENTS

| | | | |
|---|---|---|---|
| 4,112,424 | A | 9/1978 | Lapeyre |
| 4,209,815 | A | 6/1980 | Rollins et al. |
| 4,240,126 | A | 12/1980 | Sanvito |
| 4,263,638 | A | 4/1981 | Stockman et al. |
| 4,312,027 | A | 1/1982 | Stockman |
| 4,326,237 | A | 4/1982 | Markarian et al. |
| 4,352,145 | A | 9/1982 | Stockman |
| 4,447,854 | A | 5/1984 | Markarian |
| 4,558,394 | A | 12/1985 | Stockman |
| 4,586,107 | A | 4/1986 | Price |
| 4,633,365 | A | 12/1986 | Stockman |
| 4,698,725 | A | 10/1987 | MacDougall et al. |
| 4,754,361 | A | 6/1988 | Venturini |
| 4,812,941 | A | 3/1989 | Rice et al. |
| 4,897,760 | A | 1/1990 | Bourbeau |
| 5,019,934 | A | 5/1991 | Bentley et al. |
| 5,138,519 | A | 8/1992 | Stockman |
| 5,148,347 | A | 9/1992 | Cox et al. |
| 5,313,360 | A | 5/1994 | Stockman |
| 5,381,301 | A | 1/1995 | Hudis |
| 6,014,308 | A | 1/2000 | Stockman |
| 6,031,713 | A | 2/2000 | Takeisha et al. |
| 6,084,764 | A | 7/2000 | Anderson |
| 6,212,058 | B1 | 4/2001 | Huber |
| 6,282,078 | B1 | 8/2001 | Tsai |
| 6,282,081 | B1 | 8/2001 | Takabayashi et al. |
| 6,310,756 | B1 | 10/2001 | Miura et al. |
| 6,313,978 | B1 | 11/2001 | Stockman et al. |
| 6,404,618 | B1 | 6/2002 | Beard et al. |
| 6,490,158 | B1 | 12/2002 | Ellyson et al. |
| 6,847,517 | B2 | 1/2005 | Iwaida et al. |
| 6,888,266 | B2 | 5/2005 | Burke et al. |
| 6,922,330 | B2 | 7/2005 | Nielson et al. |
| 6,930,874 | B2 | 8/2005 | Lobot et al. |
| 7,046,498 | B1 | 5/2006 | Huang |
| 7,203,053 | B2 | 4/2007 | Stockman |
| 7,365,959 | B1 | 4/2008 | Ward |
| 7,423,861 | B2 | 9/2008 | Stockman |
| 7,474,519 | B2 | 1/2009 | Stockman |
| 7,492,574 | B2 | 2/2009 | Fresard et al. |
| 7,547,233 | B2 | 6/2009 | Inoue et al. |
| 7,835,133 | B2 | 11/2010 | Stockman |
| 7,881,043 | B2 * | 2/2011 | Hirose et al. ................ 361/502 |
| 7,911,762 | B2 | 3/2011 | Stockman |
| 7,911,766 | B2 * | 3/2011 | Caumont et al. ............. 361/502 |
| 7,952,854 | B2 | 5/2011 | Stockman |
| 8,174,817 | B2 * | 5/2012 | Georgopoulos et al. ...... 361/327 |
| 8,270,143 | B2 | 9/2012 | Stockman |
| 8,274,778 | B2 * | 9/2012 | Yoshinaga et al. ......... 361/301.5 |
| 8,310,802 | B2 * | 11/2012 | Fujii et al. ................. 361/275.4 |
| 8,331,076 | B2 * | 12/2012 | Tuncer ...................... 361/301.4 |
| 8,456,795 | B2 | 6/2013 | Stockman |
| 8,531,815 | B2 | 9/2013 | Stockman |
| 8,537,522 | B2 * | 9/2013 | Stockman ................. 361/301.5 |
| 2001/0025618 | A1 | 10/2001 | Kelling |
| 2008/0158780 | A1 | 7/2008 | Stockman |
| 2009/0052109 | A1 | 2/2009 | Stockman et al. |
| 2009/0219665 | A1 | 9/2009 | Stockman |
| 2011/0063775 | A1 | 3/2011 | Stockman |
| 2011/0157764 | A1 | 6/2011 | Stockman |
| 2011/0228446 | A1 | 9/2011 | Stockman |
| 2013/0003252 | A1 | 1/2013 | Stockman |

OTHER PUBLICATIONS

"American Radionic Co., Inc. Introduces A New Circuit Component The Patented Ultramet™ Capacitor," poster by American Radionic Co., Inc., (poster undated, 1980 year date appears below one image), (one page).

"American Radionic Co., Inc. Introduces A New Circuit Component, The Patented Ulramet™ Capacitor," poster by American Radionic Co., Inc., which is reprint from Electronic News dated Feb. 11, 1980, (one page).

"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).

"The Patented Ultramet™ Capacitor. A product of years of American Radionic research & development," poster by American Radionic Co., Inc. (undated) (one page).

"The Patented Ultramet™ Capacitor," poster by American Radionic Co., Inc., (undated) (three pages).

"American Radionic Introduces Capacitors Without Compromise", color brochure, 1989, 1 page.

"Capacitors—Motor Run, Oil Filled Capacitors, AC Rated. AmRad." Online archive of website captured at http:/webarchive.org/web/20011126195819/http://www.americanradionic.com, Nov. 26, 2001, 13 pages accessed May 29, 2014).

"Capacitors—Motor Run, Oil Filled Capacitors, AC Rated. AmRad." Printout of website having URL: http://amradcapacitors.com/index.htm, Jan. 3, 2003, 20 pages.

"Capacitors—Motor Run, Oil Filled Capacitors, AC Rated. AmRad." Online archive of website captured at http://webarchive.org/web/20041214091042/http://americanradionic.com, Dec. 14, 2004, 13 pages. (accessed May 29, 2014).

"American Radionics—Home of the Turbo200 MultiUse Capacitor," Online archive of website captured at http://web.archive.org/web/20050309191805fw_/http://www.americanradionic.com/home, Mar. 9, 2005, 16 pages, (accessed May 29, 2014).

"American Radionic Company's Chronology of Patents, New Products and Technology Transfer Programs—From the Present, to the Past, a Thirty-Five Year Review," online website having URL: http://www.american-adionic.com/content/blogcategory/13/29/8/16, accessed May 19, 2014, 3 pages.

"Product of the Year Awards," Electronic Products Magazine, Jan. 1981, pp. 39-45.

Parente, Audrey, "Can-sized device the right fit," The Daytona Beach News-Journal, Jan. 3, 2005, 2 pages.

"Super-Sized Show," AHSRae Journal Show Daily, 2005 International Air-Conditioning, Heating, Refrigerating Exposition, Tuesday, Feb. 8, 2005, 24 pages.

Hudis, Martin et al., "Motor-Run Capacitors," Motors & Motor Control, undated (reprinted from Appliance Manufacturer, Oct. 1994), 3 pages.

"AC Capacitors," brochure by AmRad Engineering, Inc., undated, 4 pages.

"AmRad Engineering: Universal Capacitor," The Air Conditioning|Heating|Refrigeration News, Jan. 29, 2005, Printout of website having URL: http://www.archrnews.com/articles/print/amrad-engineering-universal-capactor (accessed Jun. 2, 2014), 1 page.

\* cited by examiner

HARD START KIT FOR MULTIPLE REPLACEMENT APPLICATIONS

CLAIM OF PRIORITY

This application is a continuation application and claims priority under 35 U.S.C. §120 to U.S. patent application Ser. No. 12/927,476 filed on Nov. 15, 2010, which claims benefit under 35 USC §119(e) to U.S. Provisional Application Ser. No. 61/281,141, filed on Nov. 13, 2009, the entire contents of which are hereby incorporated by reference.

TECHNICAL FIELD

The invention herein relates to a hard start capacitor replacement unit that is adaptable in the field for replacing any one of a plurality of multiple hard start modules.

BACKGROUND

Single phase induction motors of the type commonly used with air conditioner and cooling equipment compressors generally require some type of auxiliary start capacitor for starting the motor. If the motor is a permanent split capacitor motor, i.e. one that has a run capacitor permanently connected across the run and start windings the motor, the start capacitor is connected in parallel with the run capacitor. The start capacitor, also sometimes referred to as a "hard start capacitor," is connected for a short period of time to start the motor, and the start capacitor is disconnected from the motor near or at the time the motor achieves its run speed. This time is generally on the order of 50-100 milliseconds. Therefore, the start capacitor is wired in series with contacts for disconnecting it. The contacts can be a part of a potential or control relay, or an electronic relay.

If the start capacitor or the relay controlling it fails, the motor will not start. It is then necessary to replace the start capacitor and control relay, and this generally must be accomplished at the site of the motor. For air conditioners and other cooling equipment, this site could be a home, an office, a warehouse or factory, store, or any other building. This complicates the task of replacing the start capacitor and its connecting relay, in that a wide variety of brands and sizes of air conditioning and cooling units are in use, and these units use start capacitors having a variety of capacitances. Therefore, unless a repairman has a replacement hard start kit available with the correctly sized start capacitor, the repairman cannot complete repair without returning to a shop or parts distributor that has an inventory of hard start capacitor replacement parts.

Having to return to a shop or parts distributor in order to obtain the necessary materials to complete a repair is inefficient and time consuming and also delays the time that the customer's cooling system can be returned to operation.

Therefore, it would be advantageous if a repairman could carry one hard start replacement unit that is adaptable to many air conditioning units, cooling units, or other equipment utilizing single phase motors requiring a start capacitor, so that the repairman could adapt the hard start replacement unit to the requirements at hand and complete the repair in a timely manner.

SUMMARY

It is a principal object of the invention herein to provide a hard start capacitor replacement unit adaptable to more than one motor.

It is an additional object of the invention herein to provide a hard start capacitor replacement unit with selectable capacitance.

It is also an object of the invention to provide a hand start capacitor replacement unit with circuit interruption protection.

It is a further object of the invention herein to provide a hard start capacitor replacement unit that can be configured at a repair site to provide a desired selected capacitance.

It is also an object of the invention herein to provide a hard start capacitor replacement unit with at least four selectable capacitances.

It is another object of the invention herein to provide a hard start capacitor replacement unit with selectable capacitance that mounts in substantially the same space as an original start capacitor unit.

In carrying out the invention herein a hard start capacitor replacement unit is provided having a cylindrical container with a cover. A plurality of capacitors are provided within the container, each of said capacitors having a capacitance value. The cover mounts a common terminal electrically connected to common plates of each of said plurality of capacitors. The cover also mounts a plurality of capacitance value terminals spaced apart from the common terminal and from each other, with each capacitance value terminal respectively connected to a capacitor of a corresponding capacitance value. A relay has a contact and means for opening and closing said contact in response to voltage across start and run windings of a single phase electric motor. Wire means are provided for connecting one side of the contact of the relay to one of the start and run terminals of the electric motor. Wire means are also provided for connecting the other side of the contact of the relay to a cover terminal and for connecting another cover terminal to the other of the start and run terminals of the electric motor, at least one of the wire connections being to the common terminal on the cover and the other wire connection being to a capacitance value terminal, such that at least one capacitor is connected between the relay and the motor. The capacitance value terminal is selected to connect a capacitor of the desired capacitance value. Jumper wires are connected between capacitance value terminals on the cover to connect additional capacitors, in order to select a total desired capacitance value.

In other aspects of the invention, the capacitors are wound as individual sections of one cylindrical capacitive element. The capacitors may be metallized polymer capacitors. The film may be polypropylene with a zinc coating.

In another aspect of the invention, there are four capacitors within the cylindrical capacitor container. The values of the capacitors may be about 48 microfarads, about 48 microfarads, about 88 microfarads and about 112 microfarads, each having a corresponding capacitance value cover terminal.

In additional aspects of the invention herein, the cover has four capacitive value terminals and a common terminal. The common terminal is centered on the cover. The cover terminals are separated by insulating barriers. Jumper wires are provided to selectably connect capacitance value terminals.

In yet another aspect of the invention, the cover includes circuit interruption protection.

In a further aspect of the invention, the relay is an electronic relay. The relay may also be a control or potential relay. The relay is sized to be accommodated above the capacitor container within the projected cylindrical envelope thereof. A cylindrical cap is received on the capacitor container and extends therefrom to surround the relay and cover terminals.

The cap is frictionally retained on the capacitor container and may be removed to make connections to selected capacitance value cover terminals.

The foregoing and other objects and features of the invention herein will, in part, appear in the following detailed description of the invention and claims, taken together with the drawings.

DESCRIPTION OF DRAWINGS

The same reference numerals refer to the same elements throughout the various Figures.

DETAILED DESCRIPTION

Figure 1:
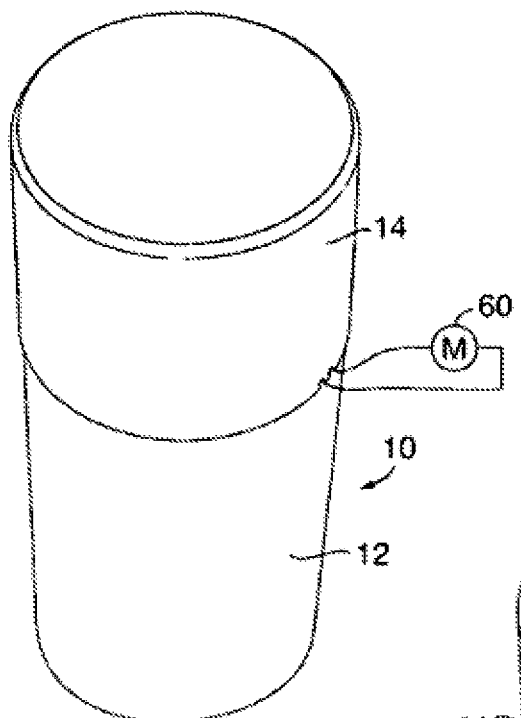
FIG. 1 is a perspective view of a hard start capacitor replacement unit according to the invention herein shown connected to a schematic motor.
Figure 2:
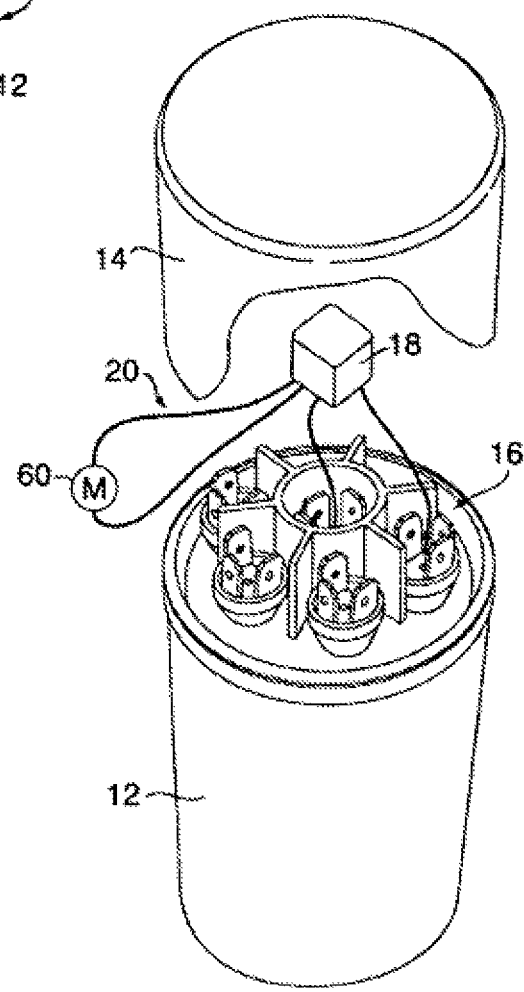
FIG. 2 is an exploded perspective view of the hard start capacitor replacement unit of FIG. 1.

With reference to FIG. 1, a hard start capacitor replacement unit 10 is shown, including a cylindrical capacitor container 12 and a cylindrical cap 14 fitted onto the container 12 and extending therefrom. With reference to FIG. 2, the cap 14 may be removed from the container 12, to expose the cover 16 of the container, an electronic relay 18, and wire means 20 providing desired electrical connections for the hard start capacitor replacement unit 10 to a motor 60.

The container 12 is preferably 2½ inches in diameter with a length of 5¾ inches and has a plurality of capacitors therein. In the embodiment shown and with reference to FIG. 3, four capacitors 22, 24, 26 and 28 are provided within the container 12. Also in the embodiment shown, the capacitors 22, 24, 26 and 28 are wound in a cylindrical capacitive element 30 having a common element terminal 32 at the bottom thereof and four capacitor terminals 23, 25, 27 and 29 at the top thereof.

The capacitors of capacitive element 30 are preferably metallized film capacitors concentrically wound together as the cylindrical capacitance element 30. The film is preferably polypropylene metallized with zinc and may be about 3.8 microns in thickness. This is an advantageous film for several reasons. First, start capacitors generally require a higher capacitance value than run capacitors, i.e., run capacitors generally have typical capacitance values in the range of about 15 to about 65 microfarads, whereas start capacitors may have typical capacitance values up to about 300 microfarads. Such high start capacitance values have generally been achieved with electrolytic capacitors because 300-microfarad capacitors with typical film thicknesses would be bulky and require a large container that may not fit into the space provided in an air conditioning unit or the like. However, with recognition that a start capacitor is utilized for about one second or less as the motor starts, it does not have to be rated at high voltage over a long period of time. Therefore, a thin film may be used and the required capacitance is attained in a reasonably sized capacitive element. A further advantage is that the resultant metallized film capacitive element has stable capacitance values over a relatively wide ambient temperature range, and also has a long service life.

Figure 3:
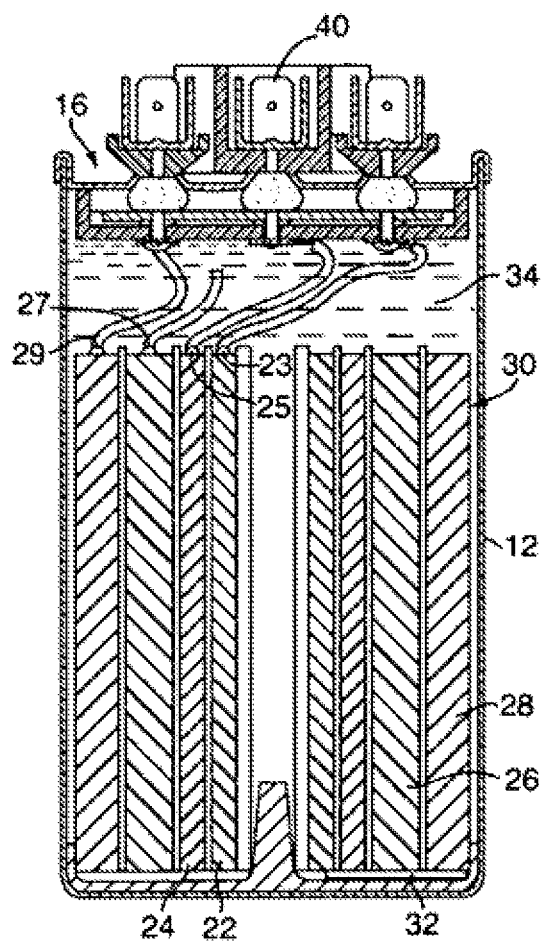
FIG. 3 is a sectional view of the capacitor, capacitor container and cover of the hard start capacitor replacement unit of FIG. 1.

The container is preferably filled with a dielectric fluid 34 and the cover 16 is provided with circuit interruption protection in the event the capacitive element fails, such as shown in FIG. 3 and described in U.S. Pat. No. 7,203,053. These are also advantages in fabricating the capacitors 22, 24, 26 and 28 for the hard start capacitor replacement unit 10 from metallized film.

Although it is preferable to provide the capacitors in a cylindrical capacitive element 30 wound of metallized film, the capacitors 22, 24, 26, 28 may be individual wound capacitors having respective ends electrically connected to form a common terminal. The capacitive element 30 may be provided with more or less than four capacitors if desired. The capacitors may also be provided as two or more capacitive elements each having multiple capacitors.

It is also contemplated to make a hard start capacitor replacement unit with a single multiple value electrolytic capacitor or multiple electrolytic capacitors that may be connected to provide selectable total capacitance values. However, according to present electrolytic capacitor technology, the container for such a capacitor or capacitors would necessarily be larger than the container for a metallized film capacitive element and the capacitance value would not be as stable over ambient temperature ranges.

In the hard stand capacitor replacement unit 10 shown and described herein, capacitor 22 has terminal 23 and preferably has a capacitance of 48 microfarads. Capacitor 24 has terminal 25, and also has a capacitance value of 48 microfarads. Capacitor 26 has capacitor terminal 27, and has a value of 88 microfarads, and capacitor 28 has capacitor terminal 29 and has a value of 112 microfarads.

As perhaps as best seen in FIGS. 5-8, the cover 16 mounts a common cover terminal 40 in the center thereof, and mounts capacitance value terminals 42, 44, 46 and 48 spaced apart from the common cover terminal 40 and from each other. The common cover terminal 40 is connected to common element terminal 32 of the capacitive element 30 and thereby to each of the capacitors 22, 24, 26 and 28. The capacitance value cover terminal 42 is connected with the terminal 23 of capacitor 22 and the capacitance cover terminal 44 is connected with the capacitor terminal 25 of capacitor 24. The capacitance cover terminal 46 is connected with the capacitor terminal 27 of capacitor 26 and capacitance value cover terminal 48 is connected with the capacitor terminal 29 of the capacitor 28. Therefore, the capacitance values of the capacitors 22, 24, 26, 28 are respectively available for wire connections at the corresponding capacitance value cover terminals 42, 44, 46, 48 on the cover 16 of container 12.

A cover insulation barrier 50 is also mounted to the cover 16 to better isolate the cover terminals. The cover insulation barrier 50 has a cylindrical portion 52 surrounding the common cover terminal 40 and has radial extending fins 54-58 that separate the other capacitance value cover terminals. An extra fin is shown, which would insulate another one or two cover terminals if an additional one or two capacitors were provided.

Figure 4:
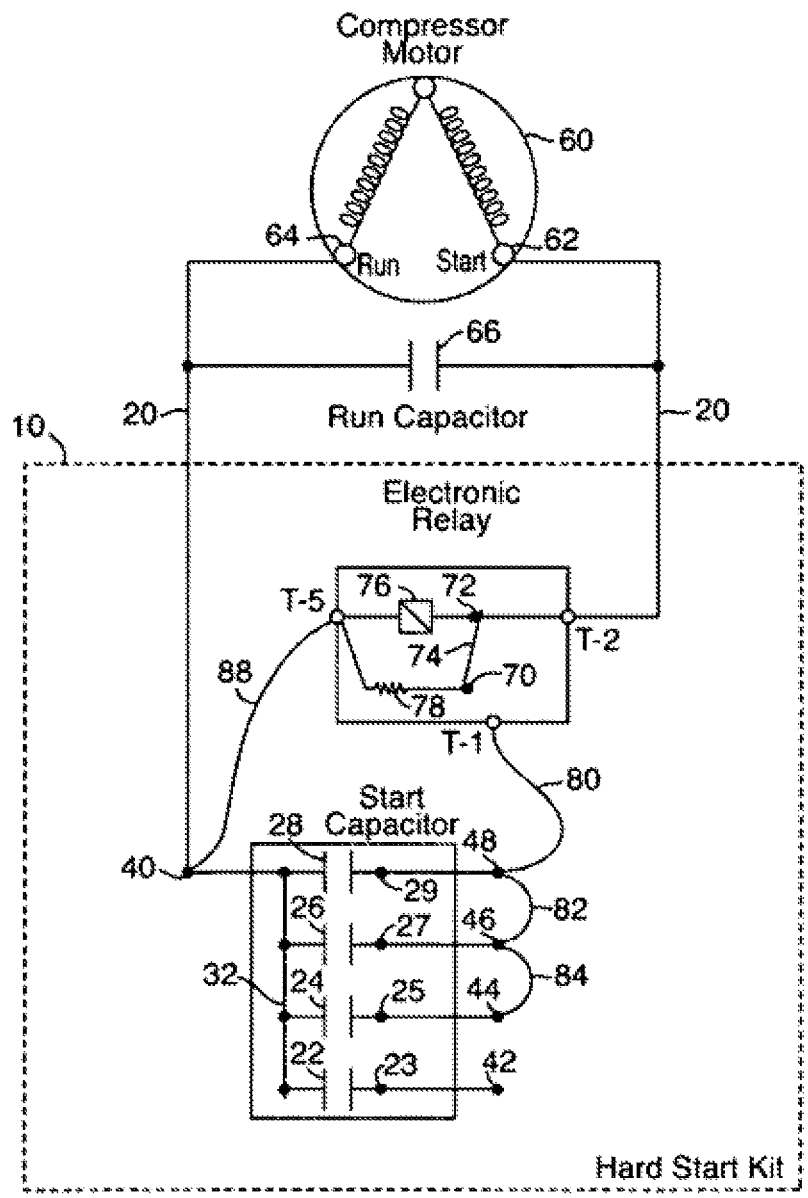
FIG. 4 is a schematic circuit diagram of the hard start capacitor replacement unit of FIG. 1, shown connected to a motor.

With reference to FIG. 4, a schematic of the operation of the start capacitor replacement unit 10 is shown. The electronic relay 18 has external terminals that accept wire termination clips, so that wire connections can be made between the common cover terminal 40, and the capacitance value cover terminals 42, 44, 46 and 48, as well as with the start and run terminals 62 and 64 of a motor 60. External terminals T-1 and T-2 of electronic relay 18 are internally connected with contacts 70 and 72 that may be closed by a contact bar 74, all schematically shown. The electronic relay 18 also has external terminal T-5, and the electronic relay 18 has circuitry indicated at 76 that monitors the voltage and the dv/dt between terminals T-2 and T-5 and controls the opening and closing of the contacts 70 and 72 in response thereto. Terminals T-2 and T-5 are connected to the start and run terminals 62 and 64 of compressor motor 60 by wires 20, so that the electronic relay is monitoring the voltage across the start and run windings. Terminal T-5 may also be connected between the start and run windings of motor 60. When the contacts 70 and 72 are closed, the electronic relay 18 connects the selected ones of the capacitors 22, 24, 26 and 28 across the terminals 62 and 64 in parallel with the run capacitor 66 to assist in starting the motor. A bleeder resister 78 discharges the capacitor(s) when contacts 70, 72 are open. A suitable electronic relay is available from Zhejiang Hongli Electric Co., Part No. HLR3800-6AM1D.

Figure 9:
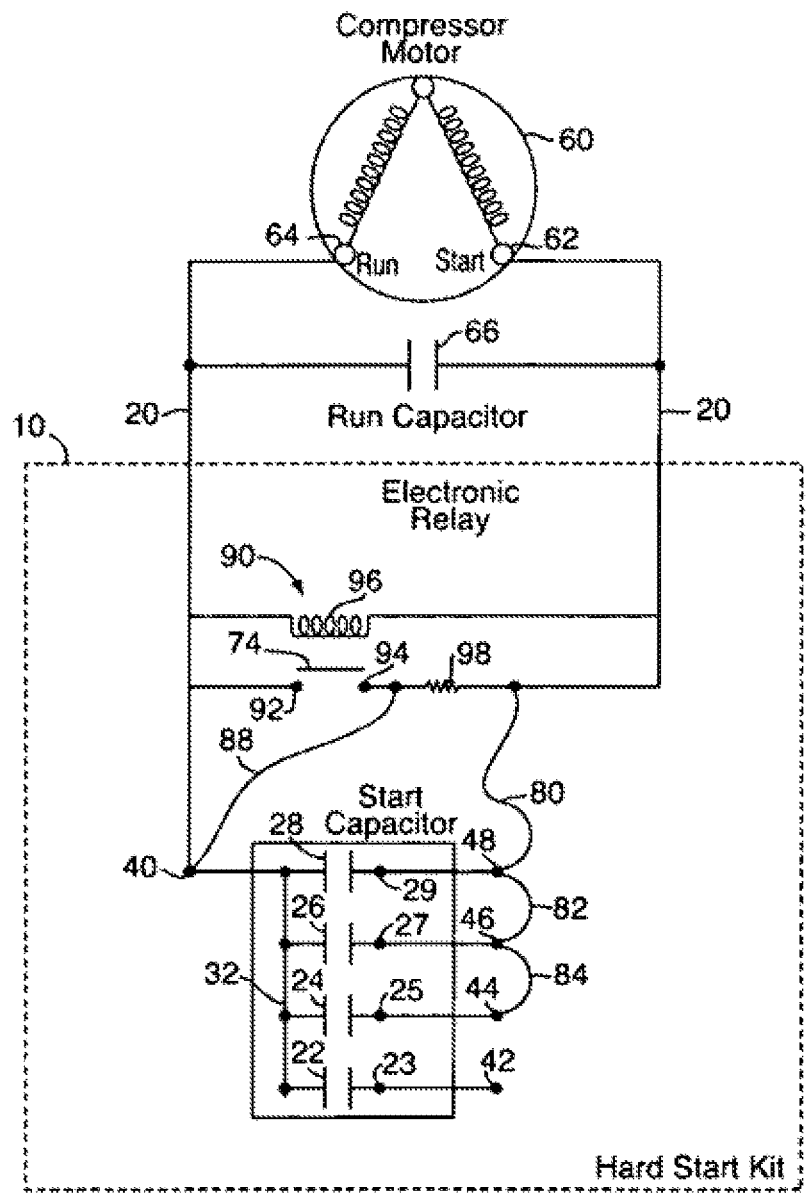
FIG. 9 is a schematic circuit diagram of another hard start capacitor replacement unit according to the invention, shown connected to a motor.

With reference to FIG. 9, the hard start capacitor replacement unit 10 may also be used with a control or potential relay 90 as shown in the schematic. The relay contacts 92 and 94 are closed by contact bar 74 to connect selected ones of capacitors 22, 24, 26, 28 across run terminals 62, 64 of motor 60, and contacts 92, 94 are opened by coil 96 when the motor 60 starts. Bleeder resister 98 is provided to bleed off the capacitor charge when the contacts 92, 94 are open.

It will also be appreciated that although the capacitors of the hard start unit 10 are shown connected across motor terminals 62, 64, the purpose of this connection is to connect the capacitors in parallel with the motor run capacitor of the motor, and any connection that accomplishes this is suitable.

Figure 8:
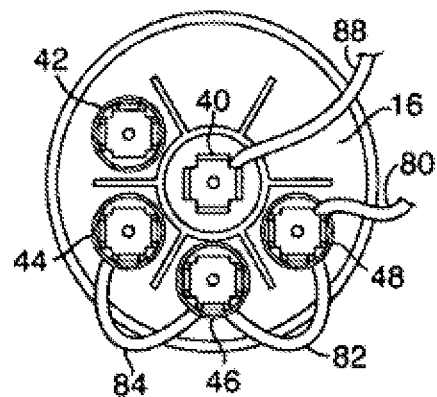
FIG. 8 is a top view of the cover and cover terminals of the hard start capacitor replacement unit of FIG. 1 showing the capacitors connected to provide a fourth capacitance value.

In FIG. 4, the capacitors 22, 24, 26 and 28 are connected as also shown in FIG. 8, in which a first wire 80 connects T-1 of the electronic relay with the cover capacitance value terminal 48, which selects 112 microfarads of capacitance value. Jumper wire 82 between capacitance value terminals 48 and 46 connects an additional 88 microfarads of capacitance value into the circuit. Wire 88 connects the common terminal 40 to terminal T-5 of the electronic relay 18. Jumper wire 84 connecting capacitance value cover terminal 46 and capacitance value cover terminal 44 connects a further 48 microfarads into the circuit. Thus, in the configuration shown in FIGS. 4 and 6, a total capacitance of 248 microfarads is provided to start the motor 60 when the contacts of the electronic relay 18 are closed.

Figure 5:
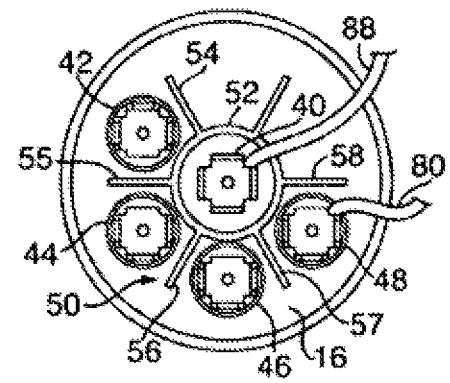
FIG. 5 is a top view of the cover and cover terminals of the hard start capacitor replacement unit of FIG. 1, showing the capacitors connected to provide a first capacitance value.
Figure 6:
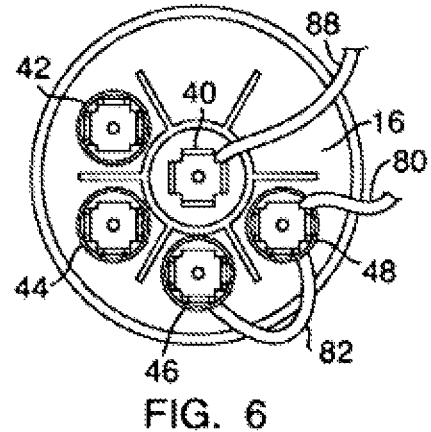
FIG. 6 is a top view of the cover and cover terminals of the hard start capacitor replacement unit of FIG. 1, showing the capacitors connected to provide a second capacitance value.
Figure 7:
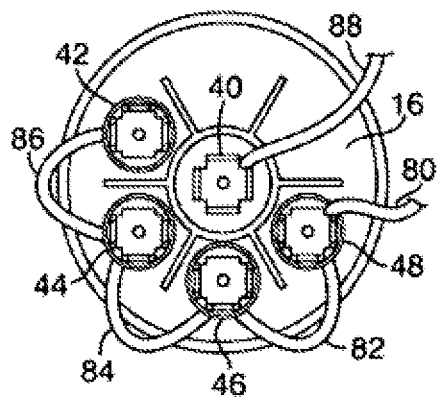
FIG. 7 is a top view of the cover and cover terminals of the hard start capacitor replacement unit of FIG. 1, showing the capacitors connected to provide a third capacitance value.

It will be appreciated that a variety of capacitance values may be selected by connecting various ones of the capacitance cover terminals to each other. Some preferred connections are shown in FIGS. 5-8. FIG. 5 shows connection of capacitor 28 by wire 80 at cover terminal 48 providing 112 microfarads, which is suitable for use where capacitance values in the range 108-130 microfarads are desired for the motor start. FIG. 6 shows connection of capacitors 26 and 28 by jumper wire 82 at cover terminals 46 and 48 providing 200 microfarads of capacitance value, which is suitable for desired capacitance values in the range of 189-227 microfarads. FIG. 7 shows all of the capacitors 22, 24, 26, 28 connected into the circuit at cover terminals 42, 44, 46 and 48 by jumper wires 82, 84 and 86 to provide a total 296 microfarads, which is suitable for use in applications requiring capacitance values in the range of 270-324 microfarads. FIG. 8 shows connection of capacitors 28, 26 and 24 by jumper wires 82 and 84 providing 248 microfarads, for use with applications requiring capacitance values of 233-280 microfarads.

If desired, the total capacitance values connected into the circuit can be further refined with possible capacitance values of 48 microfarads, 88 microfarads, 96 microfarads, 136 microfarads, 160 microfarads, 184 microfarads and 208 microfarads, being available in addition to the 112 microfarads, 200 microfarads, 240 microfarads and 296 microfarads configurations shown above.

Once the desired capacitance value is selected by placing appropriate jumper wires on the cover terminals, the cap 14 may be fitted over the container 12, to surround the cover terminals and electronic relay 18. The hard start capacitor replacement unit 10 has a suitable size and shape to be accommodated in the space provided for the original start capacitor, so the hard start replacement unit 10 is readily accepted for mounting in existing equipment.

As a result of the foregoing, a repairman can carry the hard start capacitor replacement unit 10 to repair site with confidence that a failed start capacitor unit can be replaced without need to return to a shop or parts distributor in order to complete the repair.

Accordingly, a hard start capacitor replacement unit has been described which fulfills the objects of the invention herein. It will be appreciated that various changes may be made by those skilled in the art without departing from the spirit and scope of the invention, which is limited only by the following claims.

What is claimed is:
1. An apparatus comprising:
a capacitor container having a cover;
a plurality of capacitors received within the container, each of the capacitors having a capacitance value;
a common terminal mounted on the cover and electrically connected to a common terminal of each of said plurality of capacitors;
a plurality of capacitance value terminals mounted on the cover and spaced apart from the common terminal and from each other, each capacitance value terminal respectively connected to a capacitor of the plurality of capacitors;
a relay having contacts capable of being electrically connected and disconnected in response to a monitored condition, at least one of the contacts being capable of connecting to at least one of the plurality of capacitance value terminals; and
a cover insulation barrier mounted to the cover, including a cylindrical portion substantially surrounding the common cover terminal and fins extending radially outwards from the cylindrical portion and deployed between adjacent capacitance value terminals.
2. The apparatus of claim 1 wherein the capacitors are wound as individual sections of a capacitive element.
3. The apparatus of claim 2 wherein the capacitors are metalized film capacitors.
4. The apparatus of claim 3 wherein the metalized film is polypropylene metalized with zinc.
5. The apparatus of claim 4 wherein the film is about 4 microns or less in thickness.

6. The apparatus of claim 1 wherein there are four capacitors.

7. The apparatus of claim 6 wherein the capacitors are wound as individual sections of a capacitive element.

8. The apparatus of claim 7 wherein the capacitors are metalized film capacitors.

9. The apparatus of claim 8 wherein the four capacitors have values of about 48 microfarads, about 48 microfarads, about 88 microfarads and about 112 microfarads, respectively.

10. The apparatus of claim 6 wherein the cover mounts four capacitance value terminals and a common capacitor terminal.

11. The apparatus of claim 1 wherein the relay is an electronic relay.

12. The apparatus of claim 1 wherein the relay is a control or potential relay.

13. An apparatus comprising:
- a capacitor container having a cover and capable of receiving a plurality of capacitors, each of the capacitors having a capacitance value;
- a common terminal mounted on the cover and electrically connected to a common terminal of each of the plurality of capacitors;
- a plurality of capacitance value terminals mounted on the cover and spaced apart from the common terminal and from each other, each capacitance value terminal respectively connected to a capacitor of the plurality of capacitors;
- a relay having contacts capable of being electrically connected and disconnected in response to a monitored condition, at least one of the contacts being capable of connecting to at least one of the plurality of capacitance value terminals; and
- a cover insulation barrier mounted to the cover, including a cylindrical portion substantially surrounding the common cover terminal and fins extending radially outwards from the cylindrical portion and deployed between adjacent capacitance value terminals.

14. The apparatus of claim 13 wherein the capacitors are wound as individual sections of a capacitive element.

15. The apparatus of claim 14 wherein the capacitors are metalized film capacitors.

16. The apparatus of claim 15 wherein the metalized film is polypropylene metalized with zinc.

17. The apparatus of claim 16 wherein the film is about 4 microns or less in thickness.

18. The apparatus of claim 13 wherein there are four capacitors.

19. The apparatus of claim 18 wherein the capacitors are wound as individual sections of a capacitive element.

20. The apparatus of claim 19 wherein the capacitors are metalized film capacitors.

21. The apparatus of claim 20 wherein the four capacitors have values of about 48 microfarads, about 48 microfarads, about 88 microfarads and about 112 microfarads, respectively.

22. The apparatus of claim 18 wherein the cover mounts four capacitance value terminals and a common capacitor terminal.

23. The apparatus of claim 13 wherein the relay is an electronic relay.

24. The apparatus of claim 13 wherein the relay is a control or potential relay.

* * * * *

UNITED STATES PATENT AND TRADEMARK OFFICE
CERTIFICATE OF CORRECTION

PATENT NO.        : 8,885,318 B2                                    Page 1 of 1
APPLICATION NO.   : 13/826689
DATED             : November 11, 2014
INVENTOR(S)       : Stockman It is certified that error appears in the above-identified patent and that said Letters Patent is hereby corrected as shown below:

On the Title Page, Item (56)

Page 2, Col. 2 (Other Publications), Line 6, Delete "Ulramet™" and insert -- Ultramet™ --

Page 2, Col. 2 (Other Publications), Line 23, Delete "accessed" and insert -- (accessed --

Page 2, Col. 2 (Other Publications), Line 44, Delete "AHSRae" and insert -- ASHRae --

Page 2, Col. 2 (Other Publications), Line 55, Delete "capactor" and insert -- capacitor --

Signed and Sealed this
Twenty-fourth Day of March, 2015

Michelle K. Lee
*Director of the United States Patent and Trademark Office*